US009563779B2

(12) United States Patent
Callmin et al.

(10) Patent No.: US 9,563,779 B2
(45) Date of Patent: Feb. 7, 2017

(54) SYSTEM AND METHOD FOR SECURE CROSS-DOMAIN COMMUNICATION IN A BROWSER

(71) Applicant: NetEnt AB, Stockholm (SE)

(72) Inventors: Pär Callmin, Sundbyberg (SE); Lowe Hjelm, Stockholm (SE)

(73) Assignee: NETENT PRODUCT SERVICES LTD., Ta'xbiex (MT)

( * ) Notice: Subject to any disclaimer, the term of this patent is extended or adjusted under 35 U.S.C. 154(b) by 0 days.

(21) Appl. No.: 14/484,733

(22) Filed: Sep. 12, 2014

(65) Prior Publication Data

US 2015/0082450 A1     Mar. 19, 2015

Related U.S. Application Data

(60) Provisional application No. 61/877,318, filed on Sep. 13, 2013.

(51) Int. Cl.
| | |
|---|---|
| *G06F 7/04* | (2006.01) |
| *G06F 21/60* | (2013.01) |
| *G06Q 30/02* | (2012.01) |
| *A63F 13/71* | (2014.01) |
| *H04L 29/08* | (2006.01) |

(52) U.S. Cl.
CPC ............ *G06F 21/60* (2013.01); *A63F 13/71* (2014.09); *G06Q 30/02* (2013.01); *H04L 67/10* (2013.01)

(58) Field of Classification Search
CPC ..................................................... G06F 21/128
USPC ............................................................ 726/26
See application file for complete search history.

(56) References Cited

U.S. PATENT DOCUMENTS

| | | | |
|---|---|---|---|
| 2007/0022006 A1* | 1/2007 | Lynn ................... | G06Q 30/02 705/14.4 |
| 2007/0299857 A1 | 12/2007 | Gwozdz et al. | |
| 2012/0231889 A1* | 9/2012 | Lee ..................... | A63F 13/12 463/42 |

(Continued)

FOREIGN PATENT DOCUMENTS

WO     2007047765 A2     4/2007

OTHER PUBLICATIONS

International Search Report and Written Opinion from International Application No. PCT/EP2014/069530 dated Jan. 23, 2015.

(Continued)

*Primary Examiner* — Mohammad W Reza
(74) *Attorney, Agent, or Firm* — Calfee, Halter & Griswold, LLP

(57) ABSTRACT

A method for client-side cross-domain communication of a browser application executing on a client computing device, wherein said browser application comprises a parent host window retrieving internet game operator specific first content from an internet game operators first domain, wherein said internet game operator specific first content comprises an inner window markup language element retrieving internet game provider second content from an internet game providers second domain, the method comprising the steps of determining that a game related event has occurred when processing said internet game providers second content in said inner window and sending an game event signal as game event data indicative of said determined game related event data from said inner window to said parent host window.

6 Claims, 9 Drawing Sheets

(56) References Cited

U.S. PATENT DOCUMENTS

2015/0099248 A1* 4/2015 Burgess .............. G09B 17/003
                                                                434/169

OTHER PUBLICATIONS

Gilbert, "Set Iframe Height Based on Size of Remotely Loaded Content," Solidgone Blog, Mar. 13, 2010—http://solidgone.org/Set-IFRAME-height-based-on-size-of-remotely-loaded-content.
Office Action from EP application No. 14184555.2 dated Dec. 22, 2015.
International preliminary report from international application No. PCT/EP2014/069530 dated Mar. 15, 2016.

* cited by examiner

SYSTEM AND METHOD FOR SECURE CROSS-DOMAIN COMMUNICATION IN A BROWSER

CROSS-REFERENCE TO RELATED APPLICATION

The present application claims priority to and any other benefit of U.S. Provisional Patent Application No. 61/877,318 filed on Sep. 13, 2013, and titled "System and Method for Secure Cross-Domain Communication in a Browser," the entire disclosure of which is incorporated herein by reference.

BACKGROUND

In internet gaming, in particular in internet casino gaming, certain parties, herein referred to as internet game providers, provide content, e.g. content, from internet game providers domains or domain names. Other parties, herein referred to as internet game operator provide content, e.g. content, from internet game operators domains that comprises content from internet game providers as well as operator specific content and is generally provided to end users, such as participants in internet casino games, accessing the content on a browser on their client computing device. Providing content from internet game operators therefore involves aggregating data from multiple domains through application server logic to overcome domain isolation. Domain isolation, in a matter of speaking, create a barrier between domain members and non-members, e.g. by using IPsec policies. Computers inside a first domain can communicate with no problems but computers inside a different domain cannot initiate communication with the first domain members.

SUMMARY

Systems and methods are disclosed, in accordance with one or more embodiments, which are directed to client-side cross-domain communication of a browser application.

According to one or more embodiments of the invention in the form of systems and methods disclosed herein, client-side cross-domain communication of a browser application is performed by executing on a client computing device, wherein said browser application comprises a parent host window retrieving internet game operator specific first content from an internet game operators first domain, wherein said internet game operator specific first content comprises an inner window Markup Language element retrieving internet game provider second content from an internet game providers second domain, the method including determining that a game related event has occurred when processing said internet game providers second content in said inner window, and sending a game event signal as game event data indicative of said determined game related event data from said inner window to said parent host window.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

These and other aspects of the invention will be described in the following description of a preferred embodiment of the invention, given merely as one non-restricting example, with reference to the attached drawings, of which.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
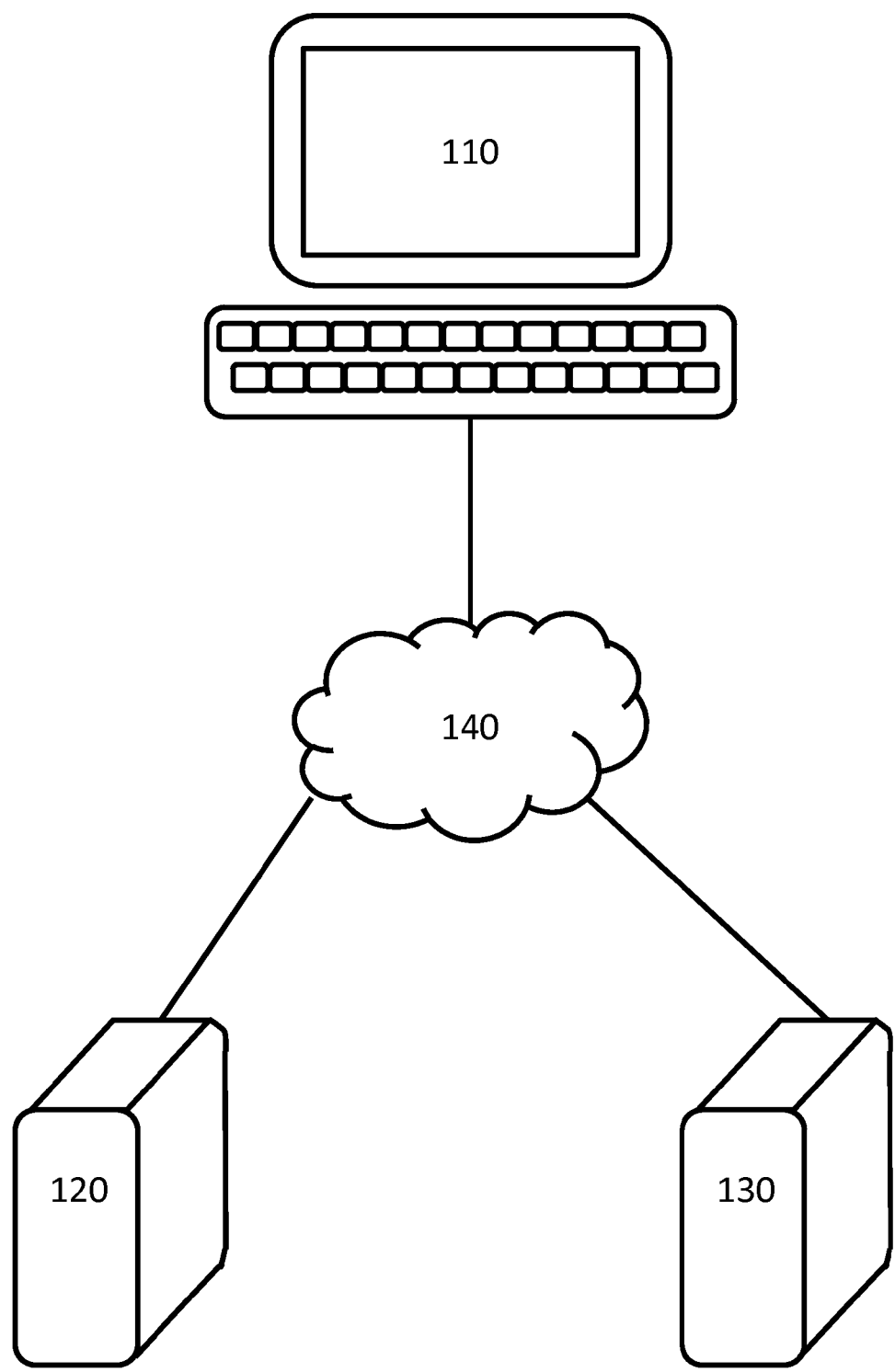
FIG. 1 shows schematically a system for secure cross-domain communication in a browser.

The invention is a method, system and device for secure cross-domain communication in a browser in an internet gaming environment.

The present invention relates to a method, system and device for secure cross-domain communication in a browser in an internet gaming environment, in particular concerning client-side cross-domain communication between second content retrieved from an internet game provider executing an in inner window Markup Language element and first content retrieved from an internet game operator executing in a parent host window.

As stated herein, in internet gaming, in particular in internet casino gaming, certain parties, herein referred to as internet game providers, provide content, e.g. content, from internet game providers domains or domain names. Other parties, herein referred to as internet game operator provide content, e.g. content, from internet game operators domains that comprises content from internet game providers as well as operator specific content and is generally provided to end users, such as participants in internet casino games, accessing the content on a browser on their client computing device. Providing content from internet game operators therefore involves aggregating data from multiple domains through application server logic to overcome domain isolation. Domain isolation, in a matter of speaking, create a barrier between domain members and non-members, e.g. by using IPsec policies. Computers inside a first domain can communicate with no problems but computers inside a different domain cannot initiate communication with the first domain members.

Typically, the content is aggregated using aggregation techniques, e.g. inner page or Iframe URL techniques as would be understood by a skilled person. An inner page or iframe is a Markup Language element, e.g. an HTML element that encapsulates and displays an entire Markup Language, e.g. HTML, document inside the inner page, enabling display of one Markup Language document inside another. The operator specific Markup Language, e.g. HTML, content is presented in an outer page or host page/parent host window acting as the inner page or iframe's parent and the operator specific Markup Language, e.g. HTML, content is retrieved, sourced or loaded from an internet game operator domain server. The content from the internet game provider is presented in an inner page or iframe and retrieved, sourced or loaded from an internet game provider domain server. The inner page's, e.g. iframe's, content may be specified by assigning a URL to the inner page, e.g. iframe's src property.

When the inner page's, e.g. iframe's, source URL has the same domain name as the outer, host page/parent host window, a JavaScript in the host page/parent host window can navigate through the inner page's, e.g. iframe's, interior Document Object Model (DOM) and see all of its contents. Conversely, the inner page can navigate up through its parent chain and see all of its DOM siblings in the host page/parent host window and their properties. However, when the inner page's source URL has a domain different from the host page/parent host window, the host cannot see the inner page's contents, and the inner page cannot see the host page/parent host window's contents. Conventional techniques solves this by sending a request from the host page/parent host window to the internet game operator domain server, the internet game operator domain server sends a request to the internet game providers domain server and the internet game providers domain server sends a request to the inner page. For communication in the other direction, the sequence would have to be reversed.

In the case of internet casino games, there is a need to synchronize content updates in the host page/parent host window with the inner page/inner window Markup Language element, e.g. by illustrating or presenting the awarding of additional bonus after game event indicative of a game result presented in the inner page. The prior art solution of client computing device 110 browser 310,330<->internet game operator domain server 120<->internet game provider domain server 130<->client computing device 110 browser 310, 320 chain of communication results in delays, that effects the gaming experience.

One of the purposes of the present invention is to reduce delay in client-side cross-domain communication between an internet game provider content in an inner page and an internet game operator content in a host page/parent host window.

Another purpose of the present invention is to achieve a secure client-side cross-domain communication between an internet game provider and an internet game operator for integrity critical game events, such as awarding an internet game operator specific bonus.
It is envisioned in one embodiment of the invention to provide direct client-side inner page to host page/parent host window communication of gaming related events.

It is further envisioned in one embodiment of the invention to provide direct client-side host page/parent host window to inner page request/reply communication of gaming related attributes.

This system and method have significant advantages over conventional previous systems and methods of reducing delay in client-side inner page to host page/parent host window communication, reducing delay in client-side host page/parent host window to inner page communication and improving gaming experience and individual game related customization of internet game operator content.

In the technical field of internet gaming, internet games are generally provided by an internet game operator through a server application running on an internet game operator domain server to a game user's client computing device running a client application, typically a web browser or browser.

Particularly in internet casino gaming, an internet game operator might offer a number of internet games presenting or displaying internet game operator specific content with integrated or aggregated internet game provider content, where the internet game provider might be retrieved or sourced from various internet game providers.

A particular internet game provider content might be presented as individual instances by several internet game operators aggregated with their individually customized internet game operator specific Content.

An example of this could be that a first internet game operator customizes the presentation of all games with an easily recognizable background, font or color set, thereby providing the user a feeling that all the games originate from the first internet game operator.

To further enhance the internet game operator customization and thereby the gaming experience it is desirable to dynamically customize the internet game operator specific content dependent on the internet game providers content. In particular in the case of when the internet game providers content comprises executable sections of code, such as a Javascript or Actionscript. A Javascript or Actionscript executing as an internet game will generate gaming events, such as winning or exiting from an internet casino game.

It would be desirable to dynamically customize the internet game operator specific content to further emphasize the event, e.g. by congratulating the user, awarding additional winnings of game credit, vouchers for products or services or promotions of internet games. The displaying or rendering of the dynamically customized internet game operator specific content is performed immediately after receiving an indication of the event, however the actual transfer of an award to the player account or "wallet" is completed only after a client computing device 110 browser<->internet game operator domain server 120<->internet game provider domain server 130<->internet game operator domain server 120<->client computing device 110 browser communication and verification. As the internet game operator specific content and the internet game providers content are loaded or retrieved from different domains on different domain servers and aggregated in the users browser application running on a client computing device 110, domain separation does not allow or severely limits direct communication between the internet game operator specific content and the internet game providers content being displayed or rendered in the browser application.

This might be specifically relevant when both the internet game operator content and the internet game providers content comprises executable sections of code, such as a java script. The conventional solution would be to follow the client computing device 110 browser inner window 310, 330<->internet game operator domain server 120<->internet game provider domain server 130<->client computing device 110 browser 310, 320 chain of communication, that introduces delays and reduces the users gaming experience as the aggregated internet game operator specific content and the internet game providers Content appears not to be synchronized.

According to one or more embodiments of the invention, a method for client-side cross-domain communication of a browser application in a client computing device, wherein said browser application comprises a parent host window retrieving internet game operator specific first content from an internet game operator first domain, wherein said internet game operator specific first content comprises an inner window Markup Language element retrieving an internet game provider second content from an internet game providers second domain, the method including:
  receiving a request for game related attributes as a signal in the form of request data from said parent host window by said inner page, wherein said game related attributes is determined based on processing of said internet game providers second content in said inner page;
  retrieving said game related attributes by said inner page based on said internet game provider second Content;
  sending a reply for game related attributes as a signal in the form of reply data from said inner page to said parent host window, wherein said reply data comprises said retrieved game related attributes.

According to one or more embodiments of the invention, a method for client-side cross-domain communication of a browser application in a client computing device, wherein said browser application comprises a parent host window retrieving internet game operator specific first content from an internet game operator first domain, wherein said internet game operator specific first content comprises an inner page Markup Language element retrieving an internet game provider second content from an internet game providers second domain, the method including:
  receiving an game event signal as game event data indicative of a determined game related event data from said inner window in said parent host window;
  dynamically adapt said internet game operator specific first content based on said game event data.

According to one or more embodiments of the invention, a method for client-side cross-domain communication of a browser application in a client computing device, wherein said browser application comprises a parent host window retrieving internet game operator specific first content from an internet game operator first domain, wherein said internet game operator specific first content comprises an inner window Markup Language element retrieving an internet game provider second content from an internet game providers second domain, the method including:
  sending a request for game related attributes as a signal in the form of request data from said parent host window to said inner page, wherein said game related attributes is determined based on processing of said internet game providers second content in said inner page;
  receiving a reply for game related attributes as a signal in the form of reply data from said inner page to said parent host window, wherein said reply data comprises game related attributes.

According to one or more embodiments of the invention, a system for client-side cross-domain communication, the system including:
  a client computing device adapted with a browser application, wherein said browser application comprises a parent host window retrieving internet game operator specific first Content from an internet game operator first domain, wherein said internet game operator specific first Content comprises an inner page Markup Language element retrieving an internet game provider second Content from an internet game providers second domain, wherein said browser application is adapted to perform the method steps of:
    determining that a game related event has occurred when processing said internet game providers second content in said inner window;
    sending an game event signal as game event data indicative of said determined game related event data from said inner window to said parent host window;
    receiving an game event signal as game event data indicative of a determined game related event data from said inner window in said parent host window;
    dynamically adapt said internet game operator specific first content based on said game event data.

According to one or more embodiments of the invention, a system for client-side cross-domain communication, the system including:
  a client computing device adapted with a browser application, wherein said browser application comprises a parent host window retrieving internet game operator specific first Content from an internet game operator first domain, wherein said internet game operator specific first Content comprises an inner page Markup Language element retrieving an internet game provider second Content from an internet game providers second domain, wherein said browser application is adapted to perform the method steps of:
    sending a request for game related attributes as a signal in the form of request data from said parent host window to said inner page, wherein said game related attributes is determined based on processing of said internet game providers second content in said inner page;
    receiving a request for game related attributes as a signal in the form of request data from said parent host window by said inner page, wherein said game related attributes is determined based on processing of said internet game providers second content in said inner page;
    retrieving said game related attributes by said inner page based on said internet game provider second Content;
    sending an reply for game related attributes as a signal in the form of reply data from said inner page to said parent host window, wherein said reply data comprises said retrieved game related attributes;
    receiving a reply for game related attributes as a signal in the form of reply data from said inner page to said parent host window, wherein said reply data comprises game related attributes.

According to one or more embodiments of the invention, a non-transitory computer-readable storage medium having executable computer program instructions embodied therein for client-side cross-domain communication, actions of the computer program instructions including:
  determining that a game related event has occurred when processing said internet game providers second content in said inner window;
  sending an game event signal as game event data indicative of said determined game related event data from said inner window to said parent host window;
  receiving an game event signal as game event data indicative of a determined game related event data from said inner window in said parent host window;
  dynamically adapt said internet game operator specific first content based on said game event data.

According to one or more embodiments of the invention, a non-transitory computer-readable storage medium having executable computer program instructions embodied therein for client-side cross-domain communication, actions of the computer program instructions including:

sending a request for game related attributes as a signal in the form of request data from said parent host window to said inner page, wherein said game related attributes is determined based on processing of said internet game providers second content in said inner page;

receiving a request for game related attributes as a signal in the form of request data from said parent host window by said inner page, wherein said game related attributes is determined based on processing of said internet game providers second content in said inner page;

retrieving said game related attributes by said inner page based on said internet game provider second Content;

sending an reply for game related attributes as a signal in the form of reply data from said inner page to said parent host window, wherein said reply data comprises said retrieved game related attributes;

receiving a reply for game related attributes as a signal in the form of reply data from said inner page to said parent host window, wherein said reply data comprises game related attributes.

Figure 5:
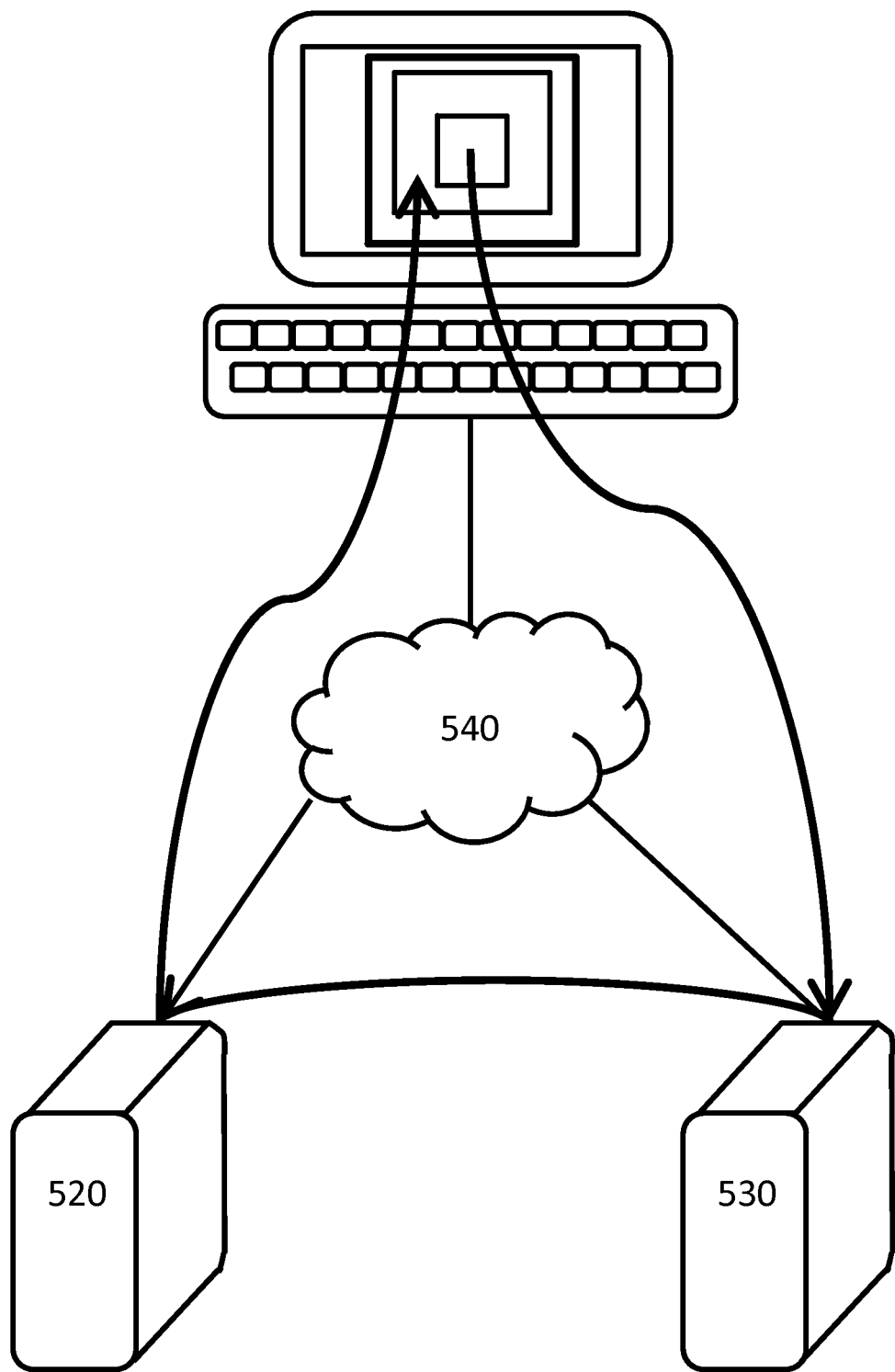
FIG. 5 illustrates a prior art solution to client-side cross-domain communication of a browser application executing on a client computing device.

FIG. 5 illustrates a prior art solution to client-side cross-domain communication of a browser application executing on a client computing device. An inner window Markup Language element 533 sends a game related event to an internet game provider domain server 530. The internet game provider domain server 530 forwards the event to an internet game operator domain server 520 that in turn forwards the event to a parent host window 532.

A problem has been identified to enable dynamical customization the internet game operator specific content based on gaming events resulting from processing of internet game providers content in a browser application executing on a client computing device.

Therefore, the inventors have realized a need for a technical solution improving client-side cross-domain communication.

A solution has been provided by the inventors by providing an additional Markup Language element or additional Markup Language sub element by the internet game provider to the internet game operator, that can be included in the internet game operator specific content, thereby allowing gaming events and gaming attributes to be communicated from the internet game providers content to the internet game operator specific content. An example of such a Markup Language element may be a function template adapted to receive and handle the game event and to dynamically customize the internet game operator specific content. The extent of the customization is thereby decided by the internet game operator.

Figure 6:
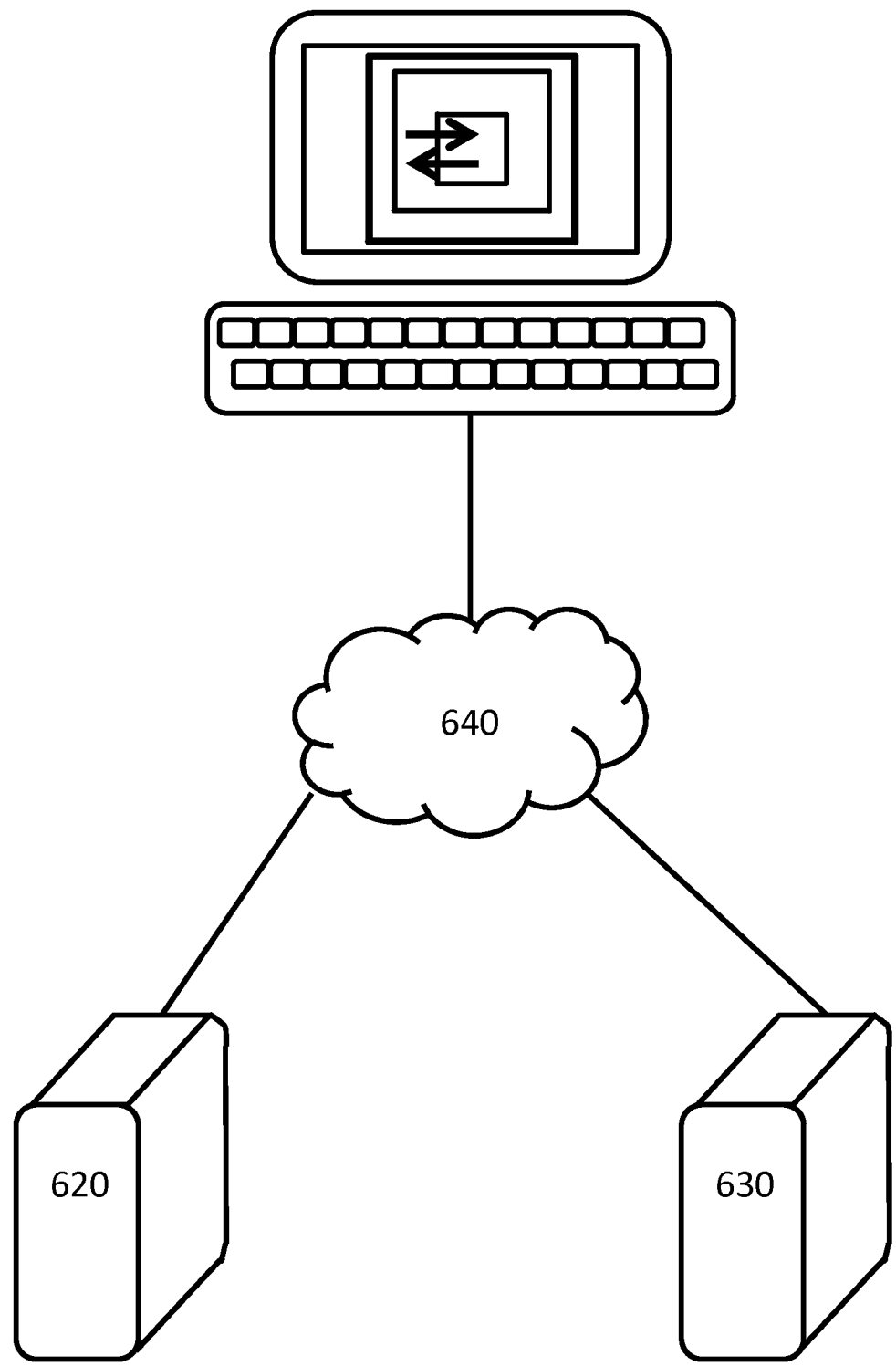
FIG. 6 illustrates the present disclosure's solution to client-side cross-domain communication of a browser application executing on a client computing device.

FIG. 6 illustrates the present disclosure's solution to client-side cross-domain communication of a browser application executing on a client computing device. An inner window Markup Language element 633 sends a game related event to a parent host window 632.

To provide client side cross domain communication between internet game operator specific content and the internet game providers content the additional Markup Language element or additional Markup Language sub element might also include functionality adapted to send a request, from a predefined number of requests defined within the additional Markup Language element, with associated request attributes, as request data. The additional Markup Language element might further include functionality adapted to receive a reply, with associated gaming attributes, as reply data.

A further problem has been identified as the integrity of communication between internet game operator specific content and the internet game provider's content in a browser application cannot always be guaranteed for gaming events resulting in an actual transfer of winnings values or game credit.

A solution has been provided by the inventors by allowing or enabling verification of integrity critical client side cross domain communication, e.g. before awarding winnings, between internet game operator specific content and the internet game providers content via conventional solution would be to follow the browser<->internet game operator domain server<->internet game provider domain server<->browser chain of communication. Thereby allowing the delay critical dynamical customization the internet game operator specific content as well as secondary less delay critical but integrity critical steps to be verified. An example of that could by to indicate an award in the display of the content immediately after receiving a gaming event but transfer game credits only after verifying the result with the internet game providers domain server.

DEFINITIONS OR CLARIFICATIONS OF EXPRESSIONS USED IN THE TEXT

Markup Language is in this document to be interpreted as a Markup Language for creating web pages and other information that can be displayed in a web browser, e.g. Hypertext Markup Language (HTML). A Markup Language comprises elements including tags within the web page content. Browser or web browser is in this document to be interpreted as a software application on a user client computing device for retrieving, presenting and traversing information resources on the World Wide Web. An information resource is identified by a Uniform Resource locator (URL) and may be a HTML web page, image, video or other piece of content. A browser retrieves or fetches information resources to a user, displays or renders the information resources and provides means for accessing other information, e.g. by navigating or following links. The prefix of an Uniform Resource locator, determines how the URL will be interpreted. The most commonly used kind of URL starts with http: and identifies a resource to be Retrieved over the Hypertext Transfer Protocol (HTTP) others are https: for HTTPS, ftp: for the File Transfer Protocol, and file: for local files. Prefixes that the web browser cannot directly handle are often handed off to another application entirely. For example, mailto: URLs are usually passed to the user's default e-mail application, and news: URLs are passed to the user's default newsgroup reader. The purpose of a browser is to retrieve HTML documents and process them into visible or audible web pages. The browser does not display the Markup Language tags, but uses the tags to interpret the content of the page.

Domain or domain name is in this document to be interpreted as an identification string that defines a realm of administrative autonomy, authority, or control on the Internet. Domain names are formed by the rules and procedures of the Domain Name System (DNS). Any name registered in the DNS is a domain name.

Domain server or domain name server is in this document to be interpreted as a device including a user interface, a processor a memory and an external communication interface. In some embodiments of the present disclosure, the memory is implemented as a first 851, 951 or second 952 database configured to comprise at least historic game related events and historic game related attributes.

Internet game provider is in this document to be interpreted as an entity with domain and/or web server functionality and an associated internet game provider's domain adapted to provide Content, to receive requests from a client browser application running on a client computing device or a server application sunning on a server and to respond to such request according to predetermined rules and logic.

Internet game operator is in this document to be interpreted as an entity with domain and/or web server functionality and an associated internet game operator domain adapted to provide Content, to receive requests from a client browser application running on a client computing device or a server application running on a server and to respond to such request according to predetermined rules and logic.

Inner page or Iframe is in this document to be interpreted as a Markup Language element that encapsulates and displays an entire Markup Language document inside the inner page, enabling display of one HTML document inside another, e.g. inside a host page/parent host window. The inner page content is sourced or loaded from an internet game provider domain server.

Host page or parent host window is in this document to be interpreted as a browsers window or HTML element adapted to display an entire HTML document and acting as the inner page's parent, wherein an operator specific Content is sourced or loaded from an internet game operator domain server.

Request is in this document to be interpreted as a signal in the form of data having a predefined meaning to the receiving entity of the request, e.g. a java or ActionScript function call.

Game provider content or game provider specific content is in this document to be interpreted as content unique to the game provider.

Internet game operator specific content is in this document to be interpreted as content unique to the internet game operator.

Internet game operator content or aggregated content is in this document to be interpreted as the aggregated content including internet game operator specific content and game provider content.

Method Embodiments

In a system for secure cross-domain communication in a browser executing on a client computing device 110, internet games in the form of internet game provider second content are in this disclosure provided by an internet game operator through a server application running on an internet game provider domain server 130 to a game user's client computing device 110 running a client application, typically a web browser or browser. The internet games are aggregated with internet game operator specific first content provided by an internet game operator through a server application running on an internet game operator domain server 120 to a game user's client computing device 110. When the second content is executed by the client computing device 110 game related events are generated based on the results of the second content execution. To reduce delay in notifying the parent host window, e.g. to adapt the first content based on the notified game related events, a method for client-side cross-domain communication of a browser application executing on a client computing device is disclosed.

Figure 4:
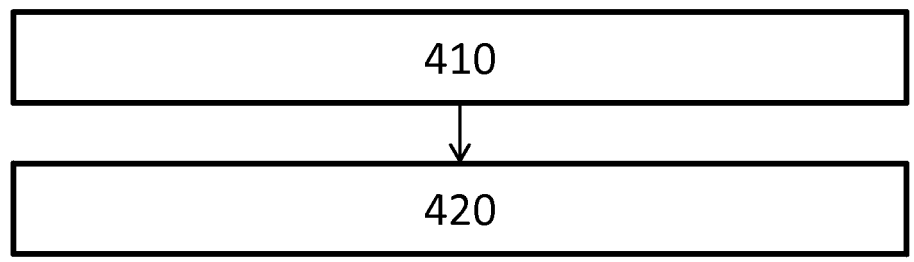
FIG. 4 shows an embodiment of method for client-side cross-domain communication of a browser application.

FIG. 4 shows an embodiment of a method for client-side cross-domain communication of a browser application 310 executing on a client computing device 110, wherein said browser application comprises a parent host window 320 retrieving internet game operator specific first content from an internet game operators first domain server 120, wherein said internet game operator specific first content comprises an inner window Markup Language element 330 retrieving internet game provider second content from an internet game providers second domain server 130, the method including:

410: determining that a game related event has occurred when processing said internet game providers second content in said inner window Markup Language element 330

420: sending a game event signal as game event data indicative of said determined game related event from said inner window Markup Language element 330 to said parent host window 320.

In one example, determining that a game related event has occurred is based on an internet game result message received from the internet game provider domain server 130. To ensure that the return to player (RTP) conform to legal requirements the result of execution of the second content is determined by the internet game provider domain server 130 and the internet game result is sent as result data in an internet game result message to the inner window Markup Language element 330. The execution of the second content typically animates the presentation of the internet game result, e.g. by animating a slot machine or playing cards in a card game.

To further enhance the user experience the parent host window 320 may be adapted based on the game related events received from the inner window Markup Language element 330.

In one or more embodiments, the method further comprises:

receiving a game event signal as game event data indicative of a determined game related event data from said inner window in said parent host window;

dynamically adapt said internet game operator specific first content based on said game event data.

In one non-limiting example, it is determined that a game related event "wheel spin started" has occurred when processing said internet game providers second content in said inner window, e.g. when the second content is simulating a slot machine game where the wheels have started spinning. Further, a game event signal as game event data indicative of said determined game related event "wheel spin started" is sent from said inner window to said parent host window. Further, said game event signal as game event data indicative of a determined game related event data is received from said inner window in said parent host window. The internet game operator specific first content is then dynamically adapted based on said game event data so that no further user interaction is accepted, e.g. to avoid that the user navigates away from the page.

In yet another non-limiting example, it is determined that a game related event "wheel spin stopped" has occurred when processing said internet game providers second content in said inner window, e.g. when the second content is simulating a slot machine game where the wheels have stopped spinning. Further, a game event signal as game event data indicative of said determined game related event "wheel spin stopped" is sent from said inner window to said parent host window. Further, said game event signal as game event data indicative of a determined game related event data is received from said inner window in said parent host window. The internet game operator specific first content is then dynamically adapted based on said game event data so that user interaction is accepted again, e.g. to allow the user to hold a wheel of the slot machine or to perform one or more nudges.

In yet another non-limiting example, it is determined that a game related event "game result event" has occurred when processing said internet game providers second content in said inner window, e.g. when the second content is simulating a slot machine game and a result is received from the game provider domain server 130 before the wheels start to spin. Further, a game event signal as game event data indicative of said determined game related event "game result event" is sent from said inner window to said parent host window. Further, said game event signal as game event data indicative of a determined game related event data is received from said inner window in said parent host window. The internet game operator specific first content is then dynamically adapted based on said game event data by visualizing that the game is starting, e.g. by displaying "game on", "let's go!" or by animating a flashing background and after the "wheel spin stopped" has been received displaying the win of the game result, e.g. by displaying the winning awarded by the game operator for this particular win. This allows the internet game operator to customize the winning awarded for a particular game result such as a monetary value, a coin value or a certificate for a gift, such as airline tickets, a car branded in the internet game operator's colors.

In yet another non-limiting example, it is determined that a game related event "jackpot win event" has occurred when processing said internet game providers second content in said inner window, e.g. when the second content is simulating a slot machine game and a result is received from the game provider domain server 130 before the wheels start to spin that corresponds to a jackpot win. Further, a game event signal as game event data indicative of said determined game related event "jackpot win event" is sent from said inner window to said parent host window. Further, said game event signal as game event data indicative of a determined game related event data is received from said inner window in said parent host window. The internet game operator specific first content is then dynamically adapted based on said game event data by visualizing that the game is starting, e.g. by displaying "game on", "let's go!" or by animating a flashing background and after the "wheel spin stopped" has been received displaying the win of the jackpot game result, e.g. by displaying the winning awarded by the game operator for this particular jackpot win or animating a jackpot, e.g. fireworks and flashing stars. This allows the internet game operator to customize the winning awarded for a particular game result such as a monetary value, a coin value or a certificate for a gift, such as airline tickets, a car branded in the internet game operator's colors.

In some instances, the execution of the second content may generate a game related event not originating from the internet game provider domain server 130, wherein the condition triggering the event is defined by a step in the execution of the first content in the parent host window.

In one example, the condition triggering the event is based on an internet game operator winning result, that would not trigger a winning "game result event" when executing the second content. Thus, the internet game operator may define additional results that are a winning results.

In one or more embodiments, wherein determining that a game related event has occurred is based on game related attributes.

In one embodiment, determining that a game related event has occurred is performed by comparing a game related attribute value to a predetermined threshold value using a predetermined rule, e.g. by determining that the game related attribute value is equal to or greater than a predetermined threshold value.

In one example, a "Bad beat bonus event" may be triggered if none of a hundred game results resulted in a winning result, thus awarding a win although only non-winning results have been received. In yet another example, a "high roller event" may be triggered if ten successive games are performed using a maximum bet monetary value or coin value, thus awarding an additional winnings value or a badge in the users player profile, as would be understood by a person skilled in the art. In yet another example, a "Player protection warning event" may be triggered if a user accumulates a loss larger than a predetermined maximum loss threshold within a predefined monitoring time window, thus providing a warning to a user to counteract player abuse or addiction.

In one or more embodiments, wherein the method further comprises:
    receiving a game result value and an associated game round identity (GID) from the internet game provider domain server 130;
    appending said GID to said game event data.

In one example, the GID may then be used to verify the game result value directly with the internet game provider domain server 130, with the internet game provider domain server 130 via the internet game operator domain server 120, or directly with the internet game operator domain server 120.

In a system for secure cross-domain communication in a browser executing on a client computing device 110, internet games in the form of internet game provider second content are in this disclosure provided by an internet game operator through a server application running on an internet game provider domain server 130 to a game user's client computing device 110 running a client application, typically a web browser or browser. The internet games are aggregated with internet game operator specific first content provided by an internet game operator through a server application running on an internet game operator domain server 120 to a game user's client computing device 110. In some situations, it is desirable to trigger actions or updates in the parent host window based on the current game status of the execution of second content that is not necessarily triggering a game related event, wherein the game status is indicated by game related attributes. E.g. indicating in the parent host window that bet amount in the internet game over a predetermined threshold has been made. To provide direct client-side host page/parent host window to inner page request/reply communication or functionality, e.g. requesting current bet amount, a method for client-side cross-domain communication of a browser application executing on a client computing device is disclosed.

A method for client-side cross-domain communication of a browser application in a client computing device, wherein said browser application comprises a parent host window retrieving internet game operator specific first content from an internet game operator first domain, wherein said internet game operator specific first content comprises an inner window Markup Language element retrieving an internet game provider second content from an internet game providers second domain, the method including:
    receiving a request for game related attributes as a signal in the form of request data from said parent host window by said inner page, wherein said game related attributes is determined based on processing of said internet game providers second content in said inner page;

retrieving said game related attributes by said inner page based on said internet game provider second Content;

sending an reply for game related attributes as a signal in the form of reply data from said inner page to said parent host window, wherein said reply data comprises said retrieved game related attributes.

In one example, the game related attribute is a selection of "Betting balance in coins", "Bet in coins", "Game round bet in coins", "Game win in coins", "previous game round win in coins", "available coin denominations", "Selected coin denomination", "Betting balance in currency", "Bet in currency", "Game round bet in currency", "Game win in currency", "previous game round win in currency", "game volume", mute activated/deactivated", "auto-play activated/deactivated".

When the first content in the parent host is executed, other events might be identified unique to the internet game operator, however the status of the execution of the second content must be identified by requesting game related attributes.

In one or more embodiments, the method further comprises:

sending a request for game related attributes as a signal in the form of request data from said parent host window to said inner page, wherein said game related attributes is determined based on processing of said internet game providers second content in said inner page;

receiving a reply for game related attributes as a signal in the form of reply data from said inner page to said parent host window, wherein said reply data comprises game related attributes.

In one or more embodiments, wherein the method further comprises:

dynamically adapt said internet game operator specific first content based on said game related attributes.

In one or more embodiments, wherein the first content further comprises an additional Markup Language element or additional Markup Language sub element.

In one or more embodiments, wherein the additional Markup Language element or additional Markup Language sub element is provided by the internet game provider to the internet game operator and included in the internet game operator specific content, thereby allowing gaming events and gaming attributes to be communicated from the internet game providers content to the internet game operator specific content.

An example of such a Markup Language element may be a function template adapted to receive and handle the game event and to dynamically customize the internet game operator specific content. The extent of the customization is thereby decided by the internet game operator.

In a system for secure cross-domain communication in a browser executing on a client computing device 110, internet games in the form of internet game provider second content are in this disclosure provided by an internet game operator through a server application running on an internet game provider domain server 130 to a game user's client computing device 110 running a client application, typically a web browser or browser. The internet games are aggregated with internet game operator specific first content provided by an internet game operator through a server application running on an internet game operator domain server 120 to a game user's client computing device 110. In some situations, it is desirable to trigger actions or updates in the parent host window based on game related events resulting from of the execution of second content, e.g. a slot machine game where events such as spin started, spin stopped and spin result is generated. To provide reduced delay adaption of the first content based on game related events, a method for client-side cross-domain communication of a browser application executing on a client computing device is disclosed.

A method for client-side cross-domain communication of a browser application in a client computing device, wherein said browser application comprises a parent host window retrieving internet game operator specific first content from an internet game operator first domain, wherein said internet game operator specific first content comprises an inner page Markup Language element retrieving an internet game provider second content from an internet game providers second domain, the method including:

receiving an game event signal as game event data indicative of a determined game related event data from said inner window in said parent host window;

dynamically adapt said internet game operator specific first content based on said game event data.

A method for client-side cross-domain communication of a browser application in a client computing device, wherein said browser application comprises a parent host window retrieving internet game operator specific first content from an internet game operator first domain, wherein said internet game operator specific first content comprises an inner window Markup Language element retrieving an internet game provider second content from an internet game providers second domain, the method including:

sending a request for game related attributes as a signal in the form of request data from said parent host window to said inner page, wherein said game related attributes is determined based on processing of said internet game providers second content in said inner page;

receiving a reply for game related attributes as a signal in the form of reply data from said inner page to said parent host window, wherein said reply data comprises game related attributes.

Security or Integrity/Client Computing Device Methods

As the methods of secure cross-domain communication in a browser executing on a client computing device 110 described above is performed on the client computing device 110 with a unknown level of integrity or security it may be vulnerable to an external attack, e.g. generating a "false" game related event or intercepting and modifying requested game related attributes and sending it to the parent host window thereby triggering an adaption of the first content not related to the execution of the first content. The present disclosure therefore allows a fast, less secure cross-domain communication of game related events and game related attributes and further provides a more secure/higher integrity mechanism with inter-server verification of game related events and game related attributes for certain tasks, e.g. when a game related event is triggering an internet game operator specific bonus, e.g. a bad beat bonus for several successive losses or negative internet game results. Then the bonus may be indicated with low delay in the parent host window whereas the actual transfer of the bonus award, e.g. to the users electronic wallet, is performed after an inter-server verification procedure.

In one or more embodiments, any of the methods above further comprises:
  sending a verification request including a game related event or a game related attribute as a signal in the form of verification request data from said parent host window;
  receiving a verification reply as a signal in the form of verification reply data to said parent host window, wherein said reply data comprises a game related event, a game related attribute or a verification attribute value;
  verifying that said verification attribute value indicates a valid game related event or a game related attribute and dynamically adapt said internet game operator specific first content based on said game event data or said game related attribute.

In one example, the game related event is an internet game result event indicating a winning result. If the verification attribute value indicates that the game related event is valid, then said internet game operator specific first content is dynamically adapted based on said game related event, e.g. by adding funds to the users electronic wallet and indicating the total in the first content being displayed to the user.

Figure 7:
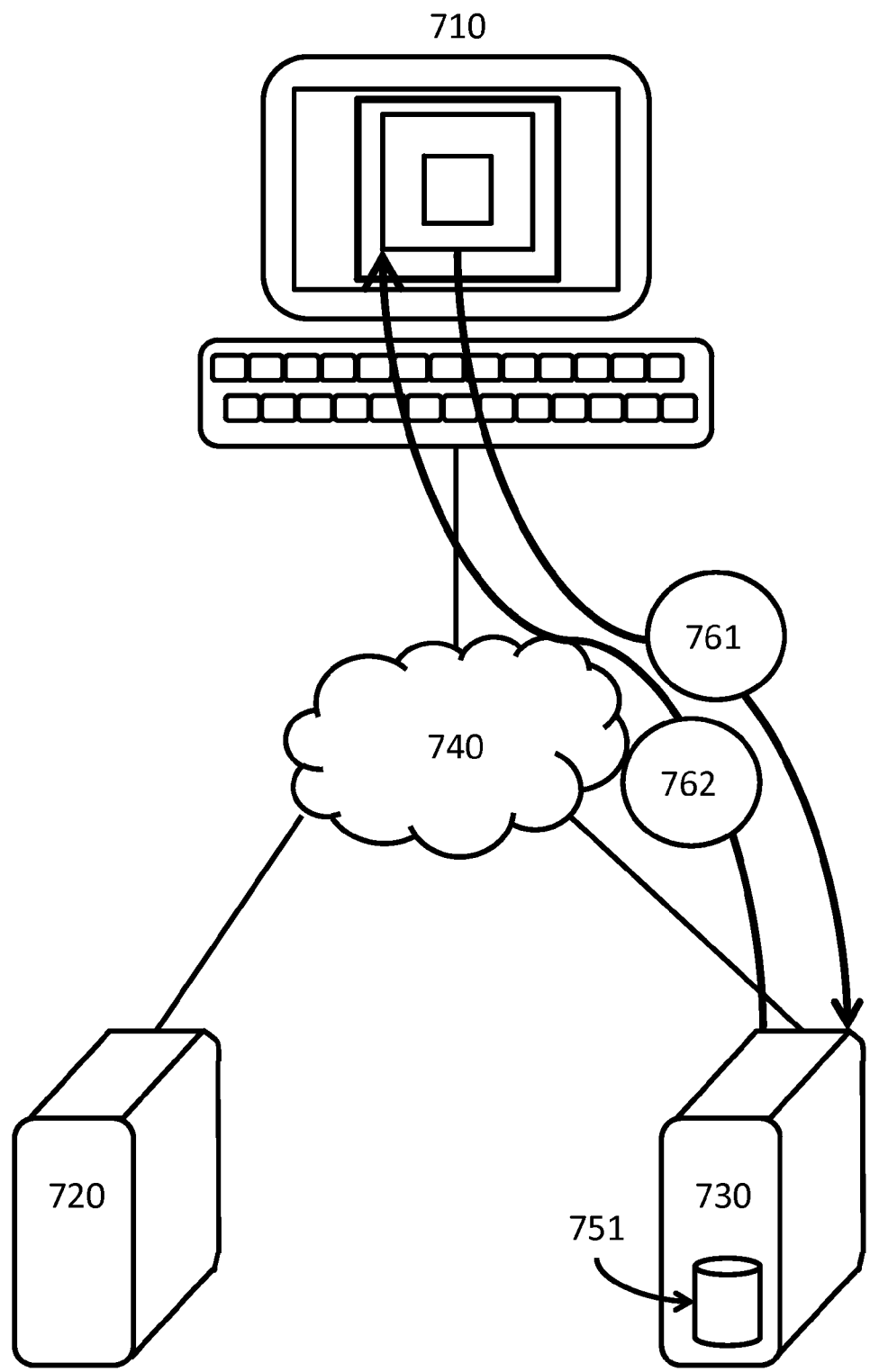
FIG. 7 illustrates one embodiment where the verification is performed directly between the client computing device and internet game provider domain server via the communication network.

FIG. 7 illustrates one embodiment where the verification is performed directly between the client computing device 110 and internet game provider domain server 130 via the communication network 140.

In one or more embodiments, the verification request is sent 961 to the internet game provider domain server 130 and the verification reply is received 962 from the internet game provider domain server 130.

Figure 8:
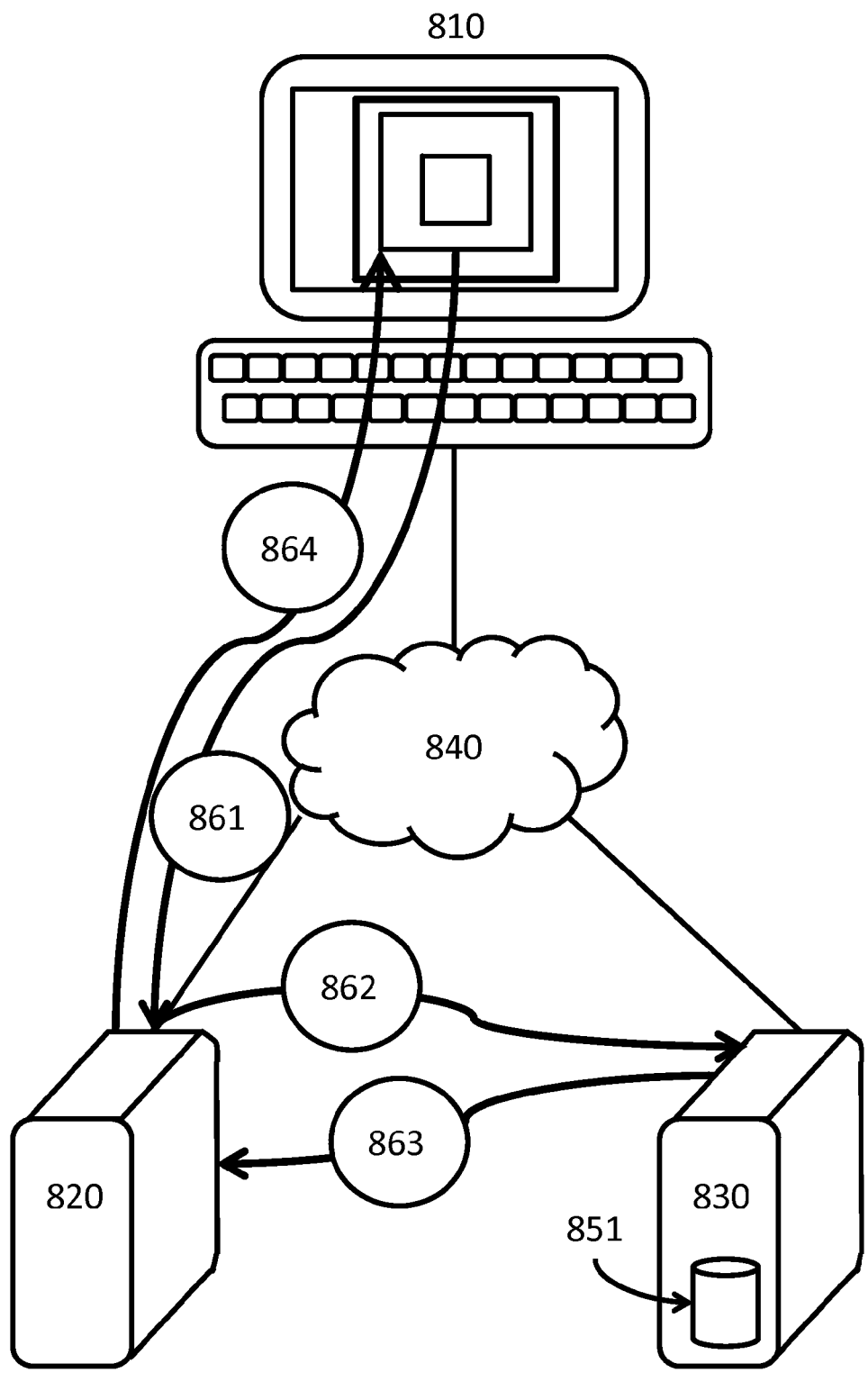
FIG. 8 illustrates one embodiment where the verification is performed between the client and internet game provider domain server via the internet game operator domain server and the communication network.

FIG. 8 illustrates one embodiment where the verification is performed between the client 110 and internet game provider domain server 130 via the internet game operator domain server 120 and the communication network 140.

In one or more embodiments, wherein the verification request is sent 861 via an internet game operator domain server 120 to 862 the internet game provider domain server 130 and wherein the verification reply is received 864 via 863 an internet game operator domain server 120 from the internet game provider domain server 130.

In one embodiment, the verification is performed directly between the client 110 and the internet game operator domain server 120 via the communication network 140.

In one or more embodiments, the verification request is sent 961 to an internet game operator domain server 120 and the verification reply is received 962 from an internet game operator domain server 120.

In one example, a "game result event" with an associated or appended winnings value and an associated or appended GID is received by the parent host window. Further a verification request including a game related event "game result event" as a signal in the form of verification request data is sent from said parent host window to the provider domain server 130 via the internet game operator domain server 120 and the communication network 140. Further, a verification reply as a signal in the form of verification reply data to said parent host window, wherein said reply data comprises a game related event, a game related attribute or a verification attribute value, e.g. the "game result event", the associated winnings value, associated GID and a verification attribute value equal to "1" or Boolean true. Further, it is verified that said verification attribute value indicates a valid game related event or a game related attribute, e.g. that the verification attribute value is equal to "1" or equal to Boolean true. If the verification attribute value indicates a valid game related event or a game related attribute then funds are added to the users electronic wallet and optionally the first content is dynamically adapted to indicating the total funds available to the user increased with the associated winnings value.

Security or Integrity-Internet Game Provider Domain Server Methods

In one embodiment of the invention, a database 751, 851 including at least historic game related events and historic game related attributes from, comprised in the internet game provider domain server 730, 830 is used for the verification procedure. Alternatively, the internet game operator domain server 720, 820 forwards 862 the verification request to the internet game provider domain server 130 and forwards the verification reply to the parent host window.

A method in an internet game provider domain server 730, 830 for client-side cross-domain communication of a browser application, wherein said browser application comprises a parent host window retrieving internet game operator specific first content from an internet game operator first domain, wherein said internet game operator specific first content comprises an inner window Markup Language element retrieving an internet game provider second content from an internet game providers second domain, the method including:
  receiving 761, 862 a verification request including a game related event or a game related attribute as a signal in the form of verification request data;
  retrieving historic game related events and historic game related attributes from a database 751, 851 comprised in the game provider domain server 730, 830;
  generating verification reply data based on said verification request data and said retrieved historic game related events and historic game related attributes, wherein generating further comprises comparing verification request data to said retrieved historic game related events and/or historic game related attributes;
  sending 762, 863 a verification reply as a signal in the form of verification reply data from said internet game provider domain server 730, 830, wherein said reply data comprises a game related event, a game related attribute or a verification attribute value.

In one or more embodiments, the a game related event or a game related attribute further comprises a game round identity (GID) and generating verification reply data further comprises comparing said GID to GIDs associated with or comprised in said retrieved historic game related events and/or historic game related attributes.

In one embodiment, the verification is performed directly between the client 710 and internet game provider domain server 730 via the communication network 740, further illustrated in FIG. 7.

In one or more embodiments, the verification request is received 761 from said parent host window 320 in said client computing device 710 browser 310 and the verification reply is sent 762 to said parent host window 320 in said client computing device 710 browser 310.

In one or more embodiments, the verification request is received 761 by said internet game provider domain server 730 from said client computing device 710 and the verification reply is sent 762 from said internet game provider domain server 730 to said client computing device 710.

In one embodiment the verification is performed between the client computing device 810 and internet game provider domain server 830 via the internet game operator domain server 820 and the communication network 840, further illustrated in FIG. 8.

In one or more embodiments, the verification request is received 862 from an internet game operator domain server 820 and the verification reply is sent 863 to an internet game operator domain server 820.

Security or Integrity-Internet Game Operator Domain Server Methods

The internet game operator domain server 820, 920 may be included in the verification procedure either as a relay node or actively by generating verification reply data.

A method in an internet game operator domain server 820, 920 for client-side cross-domain communication of a browser application, wherein said browser application comprises a parent host window retrieving internet game operator specific first content from an internet game operator first domain, wherein said internet game operator specific first content comprises an inner window Markup Language element retrieving an internet game provider second content from an internet game providers second domain, the method including:
- receiving 861, 961 a verification request including a game related event or a game related attribute as a signal in the form of verification request data from said parent host window;
- sending 864, 962 a verification reply as a signal in the form of verification reply data to said parent host window, wherein said reply data comprises a game related event, a game related attribute or a verification attribute value.

FIG. 8 illustrates one embodiment of the invention a first database 851 including at least historic game related events and historic game related attributes is used for verification and is comprised in the internet game provider domain server 830, wherein verification is performed between the client computing device 810 and the internet game provider domain server 830 via the internet game operator domain server 820.

In one or more embodiments, wherein the method further comprises:
- sending 862 said verification request including a game related event or a game related attribute as a signal in the form of verification request data to an internet game provider domain server 830;
- receiving 863 a verification reply as a signal in the form of verification reply data from said internet game provider domain server 830, wherein said reply data comprises a game related event, a game related attribute or a verification attribute value.

Figure 9:
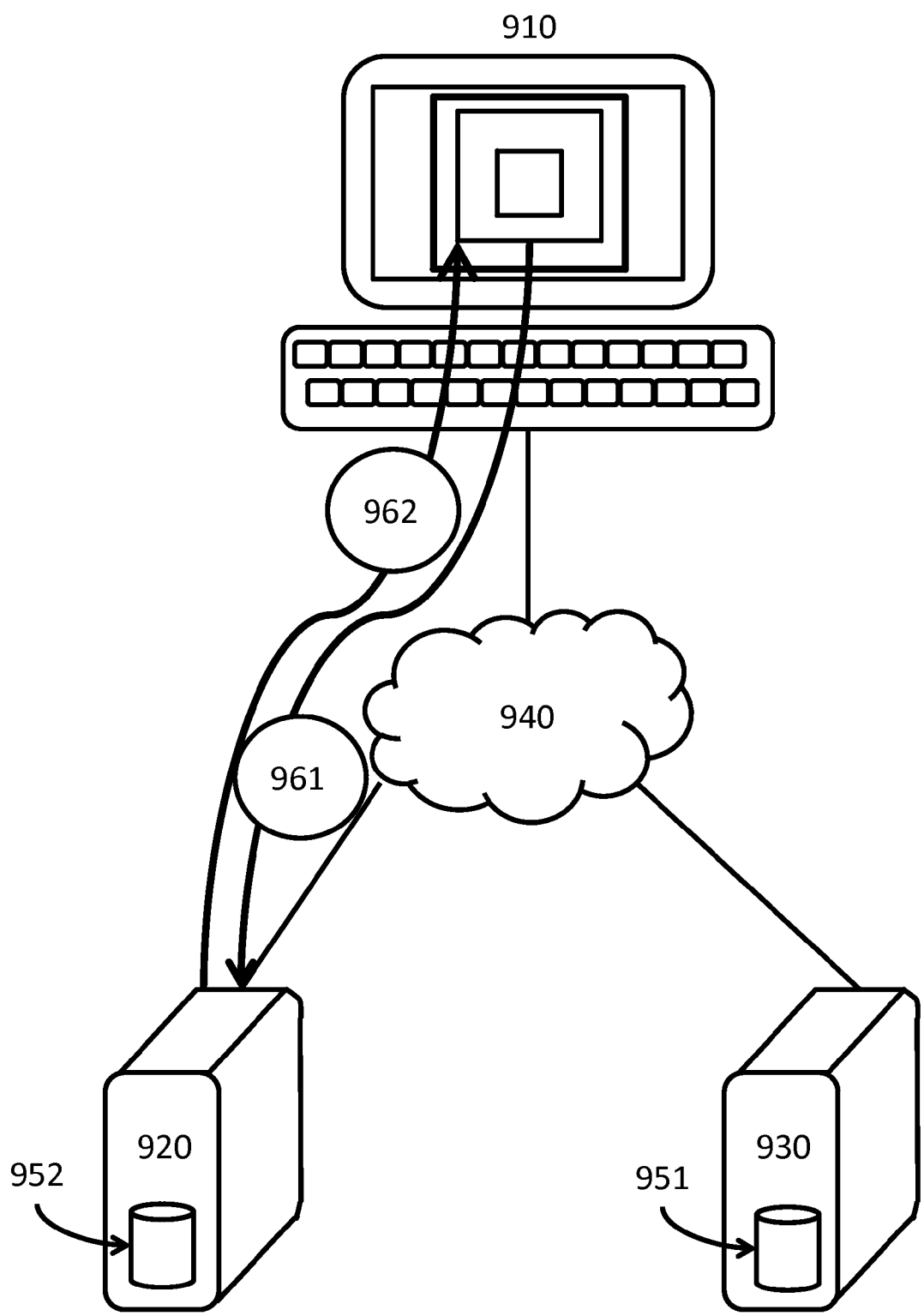
FIG. 9 illustrates an embodiment, where a second database is used for verification and is comprised in the internet game operator domain server 920.

FIG. 9 illustrates yet an embodiment, where a second database 952 including at least historic game related events and historic game related attributes is used for verification and is comprised in the internet game operator domain server 920, wherein the second database 952 is mirrored from a first database 951 comprised in the internet game provider domain server 930.

In one or more embodiments, wherein the method further comprises:
- retrieving 961 historic game related events and historic game related attributes from a database 952 comprised in the internet game operator domain server 920;
- generating verification reply data based on said verification request data and said retrieved historic game related events and historic game related attributes, wherein generating further comprises comparing verification request data to said retrieved historic game related events and/or historic game related attributes.

System Embodiments

FIG. 1 shows schematically a system for secure cross-domain communication in a browser executing on a client computing device 110. The system comprises a client computing device 110, an internet game operator domain server 120, an internet game provider domain server 130 and a communication network 140. The client computing device 110, the internet game operator domain server 120 and the internet game provider domain server 130 are communicatively coupled via a communication network 140. In one or more embodiments, wherein the internet game operator domain server 120 further comprises a second database 952. In one or more embodiments, wherein the internet game provider domain server 130 further comprises a first database.

Figure 2:
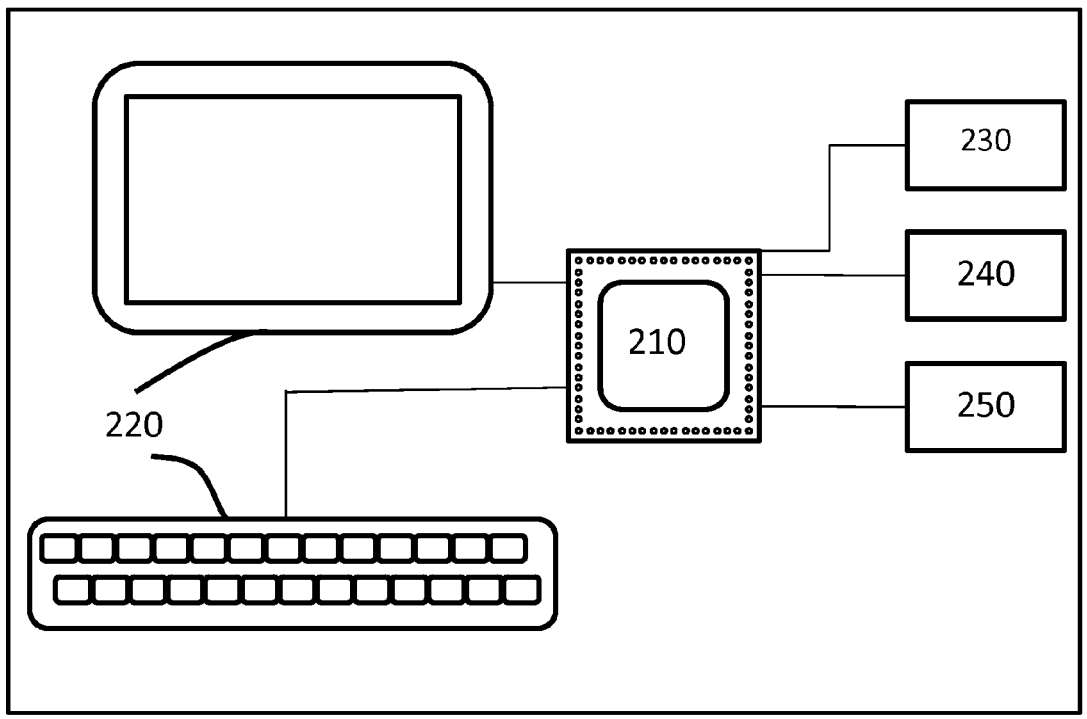
FIG. 2 shows schematically a system for a user's client computing device.

FIG. 2 shows a schematic view of one or more embodiments of a client computing device, e.g. in the form of a tablet, laptop or Smartphone, that is configured to execute a browser application. The client computing device further comprises a processor/processing unit 210 provided with specifically designed programming or program code portions adapted to control the processing unit to perform the steps and functions of embodiments of the inventive method described herein. The client computing device further comprises at least one memory 230 configured to store data values or parameters received from a processor 210 or to retrieve and send data values or parameters to a processor 210. The client computing device further comprises a communications interface 240 configured to send or receive data values or parameters to/from a processor 210 to/from external units via the communications interface 240.

In one or more embodiments the processor/processing unit 210 may be a processor such as a general or specific purpose processor/processing unit for example a microprocessor, microcontroller or other control logic that comprises sections of code or code portions, stored on a computer readable storage medium, such as a memory 230, that are fixed to perform certain tasks but also other alterable sections of code, stored on a computer readable storage medium, that can be altered during use. Such alterable sections of code can comprise parameters that are to be used as input for the various tasks, such as displaying or processing Content or any other parameter related operations known to a person skilled in the art and applied without inventive skill.

In one or more embodiments, the processor/processing unit 210 is communicatively coupled and communicates with a memory 230 where data and parameters are kept ready for use by the processing unit 210. The one or more memories 230 may comprise a selection of a hard RAM, disk drive, a floppy disk drive, a magnetic tape drive, an optical disk drive, a CD or DVD drive (R or RW), or other removable or fixed media drive.

Figure 3:
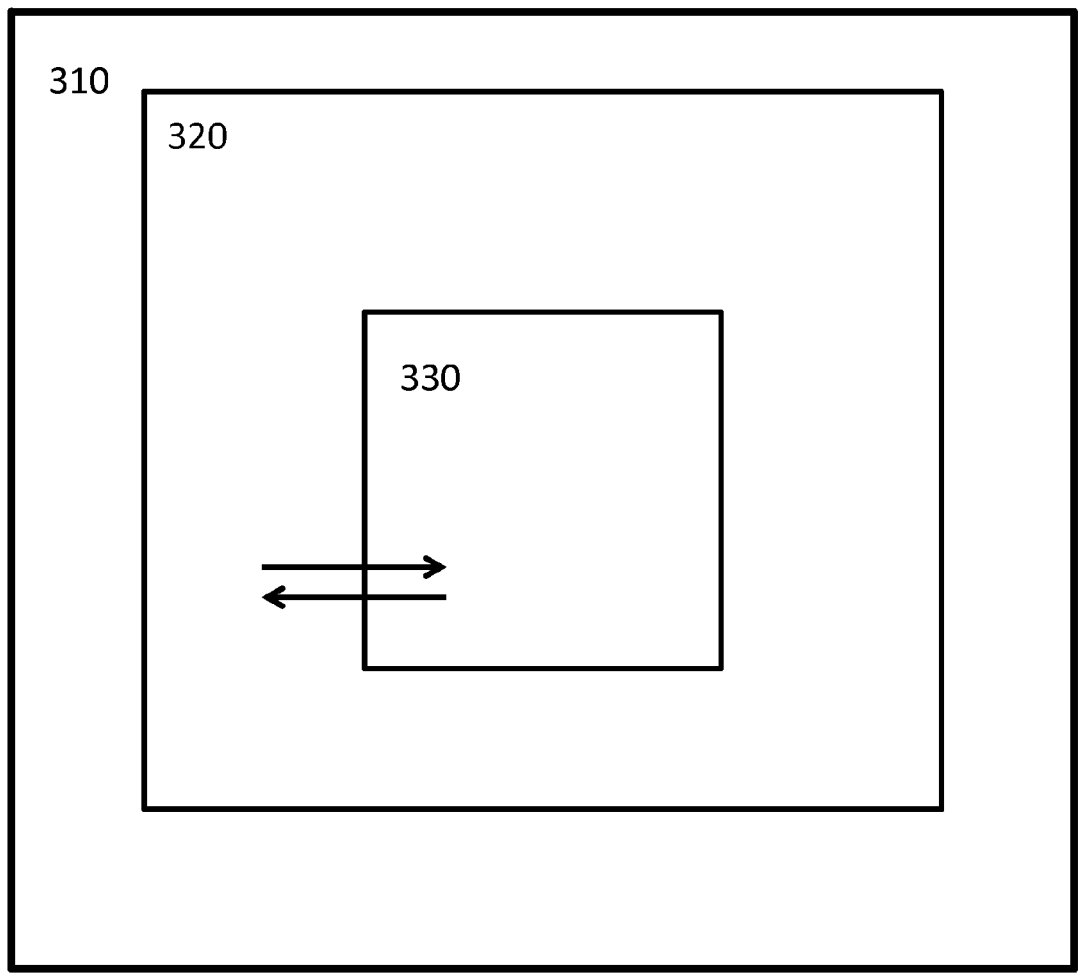
FIG. 3 shows schematically an embodiment of the invention applying client-side cross-domain communication.

FIG. 3 shows schematically an embodiment of the invention applying client-side cross-domain communication by a browser application 310, a host page or parent host window 320 and an inner page markup language element 330.

In one or more embodiments, a system for client-side cross-domain communication, the system including:
a client computing device adapted with a browser application, wherein said browser application comprises a parent host window retrieving internet game operator specific first Content from an internet game operator domain server 120, wherein said internet game operator specific first Content comprises an inner page Markup Language element retrieving an internet game provider second Content from an internet game providers domain server 130, wherein said browser application is adapted to perform the method steps of:

determining that a game related event has occurred when processing said internet game providers second content in said inner window;

sending an game event signal as game event data indicative of said determined game related event data from said inner window to said parent host window;

receiving an game event signal as game event data indicative of a determined game related event data from said inner window in said parent host window;

dynamically adapt said internet game operator specific first content based on said game event data.

In one or more embodiments, a system for client-side cross-domain communication of a browser application executing on a client computing device, wherein said browser application comprises a parent host window retrieving internet game operator specific first content from an internet game operators first domain, wherein said internet game operator specific first content comprises an inner window Markup Language element retrieving internet game provider second content from an internet game providers second domain, the system adapted or configured to perform the method steps described herein.

In one or more embodiments, a system for client-side cross-domain communication, the system including:

a client computing device adapted with a browser application, wherein said browser application comprises a parent host window retrieving internet game operator specific first Content from an internet game operator first domain, wherein said internet game operator specific first Content comprises an inner page Markup Language element retrieving an internet game provider second Content from an internet game providers second domain, wherein said browser application is adapted to perform the method steps of:

sending a request for game related attributes as a signal in the form of request data from said parent host window to said inner page, wherein said game related attributes is determined based on processing of said internet game providers second content in said inner page;

receiving a request for game related attributes as a signal in the form of request data from said parent host window by said inner page, wherein said game related attributes is determined based on processing of said internet game providers second content in said inner page;

retrieving said game related attributes by said inner page based on said internet game provider second Content;

sending an reply for game related attributes as a signal in the form of reply data from said inner page to said parent host window, wherein said reply data comprises said retrieved game related attributes;

receiving a reply for game related attributes as a signal in the form of reply data from said inner page to said parent host window, wherein said reply data comprises game related attributes.

In one or more embodiments, a client computing device 110 for client-side cross-domain communication of a browser application executing on a client computing device, wherein said browser application comprises a parent host window retrieving internet game operator specific first content from an internet game operators first domain, wherein said internet game operator specific first content comprises an inner window Markup Language element retrieving internet game provider second content from an internet game providers second domain, the system adapted or configured to perform any of the method steps described herein.

In one or more embodiments, an internet game operator domain server 120 for client-side cross-domain communication of a browser application executing on a client computing device, wherein said browser application comprises a parent host window retrieving internet game operator specific first content from an internet game operators first domain, wherein said internet game operator specific first content comprises an inner window Markup Language element retrieving internet game provider second content from an internet game providers second domain, the system adapted or configured to perform any of the method steps described herein.

In one or more embodiments, an internet game provider domain server 130 for client-side cross-domain communication of a browser application executing on a client computing device, wherein said browser application comprises a parent host window retrieving internet game operator specific first content from an internet game operators first domain, wherein said internet game operator specific first content comprises an inner window Markup Language element retrieving internet game provider second content from an internet game providers second domain, the system adapted or configured to perform the method steps described herein.

In one or more embodiments, a non-transitory computer-readable storage medium having executable computer program instructions embodied therein for client-side cross-domain communication, actions of the computer program instructions including:

determining that a game related event has occurred when processing said internet game providers second content in said inner window;

sending an game event signal as game event data indicative of said determined game related event data from said inner window to said parent host window;

receiving an game event signal as game event data indicative of a determined game related event data from said inner window in said parent host window;

dynamically adapt said internet game operator specific first content based on said game event data.

In one or more embodiments, a non-transitory computer-readable storage medium having executable computer program instructions embodied therein for client-side cross-domain communication, actions of the computer program instructions including:

sending a request for game related attributes as a signal in the form of request data from said parent host window to said inner page, wherein said game related attributes is determined based on processing of said internet game providers second content in said inner page;

receiving a request for game related attributes as a signal in the form of request data from said parent host window by said inner page, wherein said game related attributes is determined based on processing of said internet game providers second content in said inner page;

retrieving said game related attributes by said inner page based on said internet game provider second Content;

sending an reply for game related attributes as a signal in the form of reply data from said inner page to said parent host window, wherein said reply data comprises said retrieved game related attributes;

receiving a reply for game related attributes as a signal in the form of reply data from said inner page to said parent host window, wherein said reply data comprises game related attributes.

A computer program product including computer readable code is configured to, when executed in a processor, perform any or all of the method steps described herein. A non-transitory computer readable memory on which is stored computer readable code is configured to, when executed in a processor, perform any or all of the method steps described herein. Where applicable, various embodiments provided by the present disclosure can be implemented using hardware, software, or combinations of hardware and software. Also, where applicable, the various hardware components and/or software components set forth herein can be combined into composite components including software, hardware, and/or both without departing from the spirit of the present disclosure. Where applicable, the various hardware components and/or software components set forth herein can be separated into sub-components including software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method for client-side cross-domain communication of an internet casino gaming browser application executing on a client computing device, wherein said internet casino gaming browser application comprises a parent host window and an inner window, wherein the method comprising:

retrieving, by the parent host window, an internet game operator specific content from an internet game operator server provided by an internet game operator, wherein the internet game operator specific content is configured to be interpreted as content unique to the internet game operator and is configured to be processed in the parent host window, wherein said internet game operator specific content comprises an inner window Markup Language element, wherein the inner window Markup Language element is configured to encapsulate and enable display of the inner window, wherein the internet game operator specific content and the inner window Markup Language element are provided by the internet game operator;

retrieving, by the inner window Markup Language element, an internet game provider content directly from an internet game provider server provided by an internet game provider, wherein the internet game provider content is configured to be interpreted as content unique to the internet game provider and is configured to be processed in the inner window, wherein the internet game provider content is provided by the internet game provider, and wherein the internet game provider server has a domain different from the internet game operator server;

determining that a game related event has occurred when processing said internet game provider content in said inner window;

sending a game event signal as game event data indicative of said determined game related event data from said inner window to said parent host window.

2. A method for client-side cross-domain communication of an internet casino gaming browser application executing on a client computing device, wherein said internet casino gaming browser application comprises a parent host window and an inner window, wherein the method comprising:

retrieving, by the parent host window, an internet game operator specific content from an internet game operator server provided by an internet game operator, wherein the internet game operator specific content is configured to be interpreted as content unique to the internet game operator and is configured to be processed in the parent host window, wherein said internet game operator specific content comprises an inner window Markup Language element, wherein the inner window Markup Language element is configured to encapsulate and enable display of the inner window, wherein the internet game operator specific content and the inner window Markup Language element are provided by the internet game operator;

retrieving, by the inner window Markup Language element, an internet game provider content directly from an internet game provider server provided by an internet game provider, wherein the internet game provider content is configured to be interpreted as content unique to the internet game provider and is configured to be processed in the inner window, wherein the internet game provider content is provided by the internet game provider, and wherein the internet game provider server has a domain different from the internet game operator server;

receiving a request for game related attributes as a signal in the form of request data from said parent host window by said inner page, wherein said game related attributes is determined based on processing of said internet game providers second content in said inner page;

retrieving said game related attributes by said inner page based on said internet game provider second Content;

sending a reply for game related attributes as a signal in the form of reply data from said inner page to said parent host window, wherein said reply data comprises said retrieved game related attributes.

3. A method for client-side cross-domain communication of an internet casino gaming browser application executing on a client computing device, wherein said internet casino gaming browser application comprises a parent host window and an inner window, wherein the method comprising:

retrieving, by the parent host window, an internet game operator specific content from an internet game operator server provided by an internet game operator, wherein the internet game operator specific content is configured to be interpreted as content unique to the internet game operator and is configured to be processed in the parent host window, wherein said internet game operator specific content comprises an inner window Markup Language element, wherein the inner window Markup Language element is configured to encapsulate and enable display of the inner window, wherein the internet game operator specific content and the inner window Markup Language element are provided by the internet game operator;

retrieving, by the inner window Markup Language element, an internet game provider content directly from an internet game provider server provided by an internet game provider, wherein the internet game provider content is configured to be interpreted as content unique to the internet game provider and is configured to be processed in the inner window, wherein the internet game provider content is provided by the internet game provider, and wherein the internet game provider server has a domain different from the internet game operator server;

receiving an game event signal as game event data indicative of a determined game related event data from said inner window in said parent host window;

dynamically adapt said internet game operator specific first content based on said game event data.

4. A method for client-side cross-domain communication of an internet casino gaming browser application executing on a client computing device, wherein said internet casino gaming browser application comprises a parent host window and an inner window, wherein the method comprising:

retrieving, by the parent host window, an internet game operator specific content from an internet game operator server provided by an internet game operator, wherein the internet game operator specific content is configured to be interpreted as content unique to the internet game operator and is configured to be processed in the parent host window, wherein said internet game operator specific content comprises an inner window Markup Language element, wherein the inner window Markup Language element is configured to encapsulate and enable display of the inner window, wherein the internet game operator specific content and the inner window Markup Language element are provided by the internet game operator;

retrieving, by the inner window Markup Language element, an internet game provider content directly from an internet game provider server provided by an internet game provider, wherein the internet game provider content is configured to be interpreted as content unique to the internet game provider and is configured to be processed in the inner window, wherein the internet game provider content is provided by the internet game provider, and wherein the internet game provider server has a domain different from the internet game operator server;

sending a request for game related attributes as a signal in the form of request data from said parent host window to said inner page, wherein said game related attributes is determined based on processing of said internet game providers second content in said inner page;

receiving a reply for game related attributes as a signal in the form of reply data from said inner page to said parent host window, wherein said reply data comprises game related attributes.

5. A system for client-side cross-domain communication, the system comprising:

a client computing device adapted with an internet casino gaming browser application, wherein said internet casino gaming browser application comprises a parent host window and an inner window, wherein said browser application is adapted to perform the method steps of:

retrieving, by the parent host window, an internet game operator specific content from an internet game operator server provided by an internet game operator, wherein the internet game operator specific content is configured to be interpreted as content unique to the internet game operator and is configured to be processed in the parent host window, wherein said internet game operator specific content comprises an inner window Markup Language element, wherein the inner window Markup Language element is configured to encapsulate and enable display of the inner window, wherein the internet game operator specific content and the inner window Markup Language element are provided by the internet game operator;

retrieving, by the inner window Markup Language element, an internet game provider content directly from an internet game provider server provided by an internet game provider, wherein the internet game provider content is configured to be interpreted as content unique to the internet game provider and is configured to be processed in the inner window, wherein the internet game provider content is provided by the internet game provider, and wherein the internet game provider server has a domain different from the internet game operator server;

determining that a game related event has occurred when processing said internet game providers content in said inner window;

sending an game event signal as game event data indicative of said determined game related event data from said inner window to said parent host window;

receiving an game event signal as game event data indicative of a determined game related event data from said inner window in said parent host window;

dynamically adapt said internet game operator specific content based on said game event data.

6. A system for client-side cross-domain communication, the system comprising:

a client computing device adapted with an internet casino gaming browser application, wherein said internet casino gaming browser application comprises a parent host window and an inner window, wherein said browser application is adapted to perform the method steps of:

retrieving, by the parent host window, an internet game operator specific content from an internet game operator server provided by an internet game operator, wherein the internet game operator specific content is configured to be interpreted as content unique to the internet game operator and is configured to be processed in the parent host window, wherein said internet game operator specific content comprises an inner window Markup Language element, wherein the inner window Markup Language element is configured to encapsulate and enable display of the inner window, wherein the internet game operator specific content and the inner window Markup Language element are provided by the internet game operator;

retrieving, by the inner window Markup Language element, an internet game provider content directly from an internet game provider server provided by an internet game provider, wherein the internet game provider content is configured to be interpreted as content unique to the internet game provider and is configured to be processed in the inner window, wherein the internet game provider content is provided by the internet game provider, and wherein the internet game provider server has a domain different from the internet game operator server;

sending a request for game related attributes as a signal in the form of request data from said parent host window to said inner page, wherein said game related attributes is determined based on processing of said internet game providers second content in said inner window;

receiving a request for game related attributes as a signal in the form of request data from said parent host window by said inner window, wherein said game related attributes is determined based on processing of said internet game provider content in said inner window;

retrieving said game related attributes by said inner window based on said internet game provider content;

sending an reply for game related attributes as a signal in the form of reply data from said inner window to said parent host window, wherein said reply data comprises said retrieved game related attributes;

receiving a reply for game related attributes as a signal in the form of reply data from said inner window to said parent host window, wherein said reply data comprises game related attributes.

* * * * *